S. I. S. CAWTHORN & ABEL F. TATUM.
Improvement in Coffee Pots.
No. 120,938.  Patented Nov. 14, 1871.
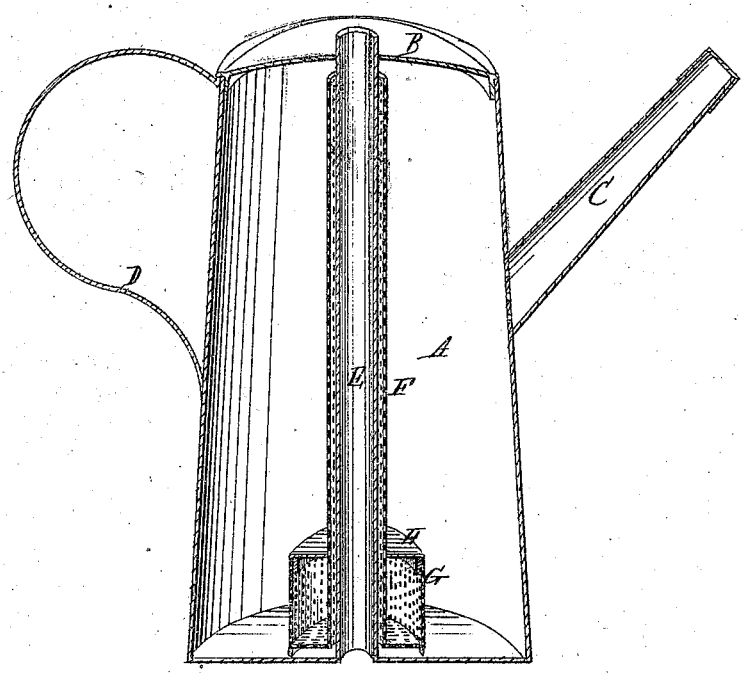

UNITED STATES PATENT OFFICE.

SIMON I. S. CAWTHON AND ABEL F. TATOM, OF TROY, ALABAMA.

IMPROVEMENT IN COFFEE-POTS.

Specification forming part of Letters Patent No. 120,938, dated November 14, 1871.

*To all whom it may concern:*

Be it known that we, SIMON I. S. CAWTHON and ABEL F. TATOM, of Troy, in the county of Pike and State of Alabama, have invented a new and valuable Improvement in Coffee-Pots; and we do hereby declare that the following is a full, clear, and exact description of the construction and operation of the same, reference being had to the annexed drawing making a part of this specification, and to the letters and figures of reference marked thereon.

Figure 1 of the drawing is a representation of a vertical section in perspective of our invention.

This invention has relation to coffee-pots; and consists in the arrangement, within a coffee-pot constructed with an upright central tube, of a perforated box to contain the ground coffee, and an upright perforated tube forming a steam-generator for the purpose of aiding in extracting the substance of the coffee.

In the accompanying drawing, A represents a coffee-pot, of which B is the lid, having a hole through the center; C, the spout; and D, the handle. E represents a central upright tube, open at the top and bottom. The upper end extends through the hole in the lid, as shown. The object of this tube is to let the heat pass up through the center of the water in the pot and boil it more quickly. F indicates a perforated tube surrounding the tube E. When the water begins to boil steam is generated in the space between the tubes. This steam is of great assistance in extracting the substance of the coffee, making it more agreeable and rendering less quantity necessary. The proximity of the tubes creates a steam-generating space between them, which has a tendency to cause a current through the coffee-box at the base of the tube F, thereby facilitating the extraction of the aromatic principle. G designates a cylindrical box, perforated as shown, and furnished with a lid, H. This box is designed to contain the ground coffee, and by means of it the water is kept clear from coffee-grounds.

We claim as our invention—

1. In a coffee-pot the perforated tubes F, in combination with the central upright flue E, substantially as and for the purpose described.

2. In a coffee-pot, the combination with the flue E of the perforated tube F and box G, substantially as and for the purpose specified.

In testimony that we claim the above we have hereunto subscribed our names in the presence of two witnesses.

SIMON I. S. CAWTHON.
ABEL F. TATOM.

Witnesses:
J. P. BOWEN,
J. P. BELSER. (136)